United States Patent
Courey, Jr.

(10) Patent No.: US 6,647,441 B1
(45) Date of Patent: Nov. 11, 2003

(54) METHOD OF MAXIMIZING SERVICING CAPABILITY OF LARGE NUMBERS OF I/O DESCRIPTORS

(75) Inventor: Charles J. Courey, Jr., Folsum, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 529 days.

(21) Appl. No.: 09/663,061

(22) Filed: Sep. 15, 2000

(51) Int. Cl.$^7$ .................................................. G06F 3/00
(52) U.S. Cl. ...................... 710/40; 710/41; 709/103; 709/105; 707/3; 707/2; 707/10
(58) Field of Search .................... 710/40, 41; 709/103, 709/105; 707/3, 2, 10

(56) References Cited

U.S. PATENT DOCUMENTS

| | | | | |
|---|---|---|---|---|
| 5,165,021 A | * | 11/1992 | Wu et al. ..................... | 709/234 |
| 5,428,526 A | * | 6/1995 | Flood et al. ................... | 700/12 |
| 5,469,571 A | * | 11/1995 | Bunnell ....................... | 709/103 |
| 5,488,724 A | * | 1/1996 | Firoozmand ................. | 709/212 |
| 6,108,683 A | * | 8/2000 | Kamada et al. .............. | 709/103 |
| 6,202,107 B1 | * | 3/2001 | Collier ........................ | 710/22 |
| 6,295,553 B1 | * | 9/2001 | Gilbertson et al. .......... | 709/207 |
| 6,298,410 B1 | * | 10/2001 | Jayakumar et al. .......... | 710/266 |
| 6,393,503 B2 | * | 5/2002 | Fishler et al. ................ | 710/113 |
| 6,408,277 B1 | * | 6/2002 | Nelken .......................... | 705/9 |
| 6,412,048 B1 | * | 6/2002 | Chauvel et al. .............. | 711/158 |
| 6,457,097 B1 | * | 9/2002 | Tamura ........................ | 711/113 |
| 6,515,681 B1 | * | 2/2003 | Knight ......................... | 345/751 |
| 6,545,999 B1 | * | 4/2003 | Sugita ......................... | 370/347 |

* cited by examiner

*Primary Examiner*—Jeffrey Gaffin
*Assistant Examiner*—Niketa Patel

(57) ABSTRACT

The present invention comprises an efficient and portable method and algorithm module for servicing large numbers of IO descriptors which may interface to a large network environment or to a large number of IO devices and services. The method and algorithm module queries those descriptors that are most likely to have activity, but also reliably queries all descriptors over time, and dynamically adjusts the frequency of queries to maintain maximum efficiency as conditions change. It also queries all descriptors within a reasonable time, and has minimal overhead and uses standard system interfaces.

13 Claims, 3 Drawing Sheets

Example Configuration of Priority Table

| 0 | 0 | 0 |
|---|---|---|
| priority 1<br>hitsToAdvance x<br>missesToDrop 2<br>selectWidth TBD<br>timeOut 1ms | priority 3<br>hitsToAdvance 2<br>missesToDrop 2<br>selectWidth TBD<br>timeOut 1ms | priority 10<br>hitsToAdvance 2<br>missesToDrop x<br>selectWidth TBD<br>timeOut 1ms |

| System Call/Macro | New Priority Select Call |
|---|---|
| Select | prioritySelect.Select |
| FD_SET | prioritySelect.Fd_ReadSet<br>prioritySelect.Fd_WriteSet |
| FD_ISSET | prioritySelect.Fd_ReadIsSet<br>prioritySelect.Fd_WriteIsSet |
| FD_ZERO | prioritySelect.Fd_ZeroAll |

FIG. 1

| Descriptor | | n - 1 | n | n + 1 | |
|---|---|---|---|---|---|
| Read | ... | hits<br>misses<br>priortyTableIndex | hits<br>misses<br>priortyTableIndex | hits<br>misses<br>priortyTableIndex | ... |
| Write | | hits<br>misses<br>priortyTableIndex | hits<br>misses<br>priortyTableIndex | hits<br>misses<br>priortyTableIndex | |

FIG. 2

| priority<br>hitsToAdvance<br>missesToDrop<br>selectWidth<br>timeOut | priority<br>hitsToAdvance<br>missesToDrop<br>selectWidth<br>timeOut | priority<br>hitsToAdvance<br>missesToDrop<br>selectWidth<br>timeOut | . . . |
|---|---|---|---|

FIG. 3

Example Configuration of Priority Table

| 0 | | 0 | | 0 | |
|---|---|---|---|---|---|
| priority | 1 | priority | 3 | priority | 10 |
| hitsToAdvance | x | hitsToAdvance | 2 | hitsToAdvance | 2 |
| missesToDrop | 2 | missesToDrop | 2 | missesToDrop | x |
| selectWidth | TBD | selectWidth | TBD | selectWidth | TBD |
| timeOut | 1ms | timeOut | 1ms | timeOut | 1ms |

FIG. 4

Example of iterating through a Value array.   Select = prioritySelect.Select

Select 1 - priority table index 0 - priority 1 - time out 1ms

| 0 | 0 | 1 | 0 | 0 | 1 | 0 | 0 | 1 | 2 |
|---|---|---|---|---|---|---|---|---|---|
| ▲ | | | | | | | | | |

Select 2 - priority table index 0 - priority 1 - time out 1ms

| 0 | 0 | 1 | 0 | 0 | 1 | 0 | 0 | 1 | 2 |
|---|---|---|---|---|---|---|---|---|---|
| | ▲ | | | | | | | | |

Select 3 - priority table index 1 - priority 3 - time out 10ms

| 0 | 0 | 1 | 0 | 0 | 1 | 0 | 0 | 1 | 2 |
|---|---|---|---|---|---|---|---|---|---|
| | | ▲ | | | | | | | |

Select 4 - priority table index 0 - priority 1 - time out 1ms

| 0 | 0 | 1 | 0 | 0 | 1 | 0 | 0 | 1 | 2 |
|---|---|---|---|---|---|---|---|---|---|
| | | | ▲ | | | | | | |

Select 5 - priority table index 0 - priority 1 - time out 1ms

| 0 | 0 | 1 | 0 | 0 | 1 | 0 | 0 | 1 | 2 |
|---|---|---|---|---|---|---|---|---|---|
| | | | | ▲ | | | | | |

Select 6 - priority table index 1 - priority 3 - time out 10ms

| 0 | 0 | 1 | 0 | 0 | 1 | 0 | 0 | 1 | 2 |
|---|---|---|---|---|---|---|---|---|---|
| | | | | | ▲ | | | | |

Select 7 - priority table index 0 - priority 1 - time out 1ms

| 0 | 0 | 1 | 0 | 0 | 1 | 0 | 0 | 1 | 2 |
|---|---|---|---|---|---|---|---|---|---|
| | | | | | | ▲ | | | |

Select 8 - priority table index 0 - priority 1 - time out 1ms

| 0 | 0 | 1 | 0 | 0 | 1 | 0 | 0 | 1 | 2 |
|---|---|---|---|---|---|---|---|---|---|
| | | | | | | | ▲ | | |

Select 9 - priority table index 1 - priority 3 - time out 10ms

| 0 | 0 | 1 | 0 | 0 | 1 | 0 | 0 | 1 | 2 |
|---|---|---|---|---|---|---|---|---|---|
| | | | | | | | | ▲ | |

Select 10 - priority table index 2 - priority 10 - time out infinite

| 0 | 0 | 1 | 0 | 0 | 1 | 0 | 0 | 1 | 2 |
|---|---|---|---|---|---|---|---|---|---|
| | | | | | | | | | ▲ |

FIG. 5

METHOD OF MAXIMIZING SERVICING CAPABILITY OF LARGE NUMBERS OF I/O DESCRIPTORS

The present invention generally relates to computer software and more particularly to an improved method of efficiently servicing large numbers of simultaneous IO descriptors that are mapped to IO devices or services such as network interfaces or interprocess communication.

Software modules that must service large numbers of IO descriptors[1] at once traditionally query each descriptor and then process the descriptor if there are actions that can be performed. (In this regard, descriptors can be read from or written to and such actions are referred to as activity herein.) This approach is optimal if there is maximum activity (or close to maximum) on all descriptors or if not, descriptor queries are very fast. Servicing large numbers of descriptors efficiently becomes more challenging however if there is maximum activity on relatively few and querying a descriptor for activity takes a relatively significant period of time and resources.

A descriptor is generally defined as an integer, string or other small data value, which refers to one of several objects allocated to a program by the operating system, usually the kernel.

Traditionally, prior implementations have not had these concerns since PCs and workstations are extremely fast and have adequate resources. However, two things have recently changed, i.e., the Internet has made much larger numbers of independent IO (input/output) points much more likely and network connectivity is becoming a much larger part of the embedded systems environment. As a result, implementations must now address these developments in the form of utilizing an algorithm module that maximizes efficiency and portability.

More specifically, an efficient algorithm must attempt to query the descriptors that are likely to have activity more often than those that do not. This insures that expensive queries that are made will more often result in descriptor activity being encountered. It also means that time and resources that might otherwise be used to discover no activity on potentially large numbers of descriptors be made available for the processing of busy descriptors. It must also recognize when descriptors change in their activity level relatively quickly, i.e., if a particular descriptor begins to have increased activity, it must be queried more often and if activity decreases, it must be queried less often. This dynamic adjustment must be performed continually to maintain maximum efficiency regardless of changing conditions. The algorithm also must eventually (within a reasonable period of time) query all descriptors, regardless of activity to insure that there is no starvation (lack of servicing) among descriptors. Lastly, it must have relatively minimal overhead and use standard, well known system interfaces, which facilitate portability, rather than specialized ones.

OBJECTS OF THE INVENTION

Accordingly, it is a primary object of the present invention to provide a method and algorithm module for servicing large numbers of IO descriptors which may include a large network environment that may include the Internet, which method and algorithm module achieves optimum efficiency and superior portability.

More particularly, it is an object of the present invention to provide an improved method and algorithm module which queries those descriptors that are most likely to have activity, but which also reliably queries all descriptors over time, and which dynamically adjusts the frequency of queries to optimize efficiency as conditions change, which results in faster movement of data through the system.

Yet another object of the present invention is to provide such an improved method and algorithm that can be used without significantly increasing overhead and without using specialized system interfaces.

Still another object of the present invention is to provide such an improved method and algorithm that can be easily installed and thereafter function as the interface between a software application and the standard IO interface facility known as select in a manner which does not require specialized help from the system environment or any conscious effort.

Other objects and advantages will be apparent from the following discussion in connection with the attached drawings.

SUMMARY OF THE INVENTION

The present invention comprises an efficient and portable method and algorithm module for servicing large numbers of IO descriptors which may interface to a large network environment or to a large number of IO devices and services. The method and algorithm module queries those descriptors that are most likely to have activity, but also reliably queries all descriptors over time, and dynamically adjusts the relative frequency of queries of each descriptor to maintain maximum efficiency as conditions change.

To satisfy portability requirements, the algorithm module becomes the interface between the application code processing the IO and the standard select facility and associated macros. This module allows an application to manage several IO points efficiently without specialized help from the system environment and without requiring any modification of methodology.

DESCRIPTION OF THE DRAWINGS

FIG. 1 is a table illustrating a number of priority select system calls that are used to replace standard system calls used to allow an application to simultaneously query multiple IO points.

FIG. 2 is a table illustrating a plurality of descriptors.

FIG. 3 is a priority array table.

FIG. 4 is a priority array table illustrating an example configuration.

FIG. 5 is a chart illustrating an iteration through a value array utilizing the example configuration shown in FIG. 4.

DETAILED DESCRIPTION OF THE PREFERRED EMBODIMENT

Broadly stated, the present invention comprises a method and algorithm module that efficiently and simultaneously services large numbers of IO descriptors. As previously stated, an efficient algorithm attempts to query descriptors that are likely to have activity, and dynamically adjusts to changing activity levels. It must also query all descriptors within a reasonable time, and it is desirable that it has minimal overhead and use standard system interfaces. As an example, the method and algorithm module of present invention can be used in a web server to communicate with dozens or even hundreds of computers on a network that may require data exchange. The module will interface the web server with the computers and operate to have the data exchange carried out quickly.

To successfully satisfy the previously discussed algorithmic requirements, a basic heuristic approach is necessary since it cannot be known whether a descriptor can have activity prior to querying it. If successive queries all show activity, then it is likely that the next query will also show activity. Conversely, if successive queries show no activity, then it is likely that the next query will also show no activity. Therefore, descriptors are grouped into priorities based on their previous activity, with each priority grouping having an upper and lower threshold. When consecutive positive queries on a descriptor reach the upper threshold, the descriptor is moved to the next higher priority until it is at the highest priority. Likewise, when consecutive negative queries on a descriptor reach the lower threshold, the descriptor is moved down in priority until it is at the lowest priority. Since there is constant dynamic adjustment, descriptors will migrate quickly to the appropriate priority for their activity level, even if that activity level is constantly changing.

Priority levels must determine directly the relative amount of times that a descriptor is queried. Since an IO task is driven by the activity on its descriptors, a driver loop of descriptor queries and resulting actions will insure that there are successive iterations of queries. The highest priority that a descriptor can have results in a query on that descriptor each time through this loop. Lower priorities determine the number of loops that must be iterated through between each query. Therefore, a descriptor with priority n will get queried every n times through this driver loop. In the highest priority case, n=1. All other priority values are determined relative to the highest priority case and can have any value n>1 meaning that priority value is inversely proportional to priority. A minimum priority (maximum n=N) must be insured for all descriptors to prevent starvation and this N value will determine the relative speed at which an inactive descriptor can react to new activity. The number of intermediate priorities ip (1<ip<N) determine the response to descriptors with both varying degrees of activity as well as the speed at which a descriptor can reach the highest or lowest priority. A system that attempts to maximize potential throughput across the busiest descriptors with less regard for immediate response to less active descriptors will use minimal intermediate priorities since they will result in more descriptor queries at the expense of throughput. Similarly, a higher N would query minimal activity descriptors less frequently, resulting in greater potential throughput on active descriptors. Some implementations however may choose to sacrifice a degree of maximum throughput to have a faster response to descriptors with moderate to minimal activity.

Since it is also possible that high priority descriptors may all cease to have activity, the algorithm must be careful not to block indefinitely until all descriptors have been queried. To prevent such blocking, it is preferred that the module allow for queries that wait for success on IO points for a determinate period of time called a time out. This causes the application/task making the query to suspend until either the time out period is reached, or activity occurs on one of the IO points queried. The time out values should be minimal for higher priorities and can change for lower priorities, but should not be infinite until the lowest priority is reached. It can then be maximum or infinite. Since high priority descriptors are likely to have activity anyway, the timeout can be very minimal. As priority decreases, the timeouts may increase or stay the same depending on the desired behavior. Longer timeouts may result in activity at higher priority levels as well as reduced migration to other priority levels and shorter timeouts may result in the lowest priority query being reached more quickly and greater opportunity for priority migration.

In the preferred embodiment discussed herein, queries are made to descriptors using the select system call. This call uses read and write masks well known to those of ordinary skill in the art to determine which descriptors to query. This call also takes a time out value that causes the select to return after the given time expires regardless of descriptor activity. The preferred embodiment implementation replaces all calls and supporting calls/macros for the system select facility with new calls and are shown in FIG. 1. The present invention works well with the BSD Socket interface, which is commonly used in large scale networks and in the Internet. The BSD Socket interface supports the TCP/IP protocol that is commonly used on the Internet. The masks are tracked internally to the implementation so only the descriptor number needs to be provided. There are four internal masks that are used:

readNow—filled with descriptors having the current priority or higher and is passed to the system select as the read mask.

writeNow—filled with descriptors having the current priority or higher and is passed to the system select as the write mask.

readLater—all descriptors set using Fd_ReadSet are tracked here.

writeLater—all descriptors set using Fd_WriteSet are tracked here.

When $Fd_{13}$ ReadSet/Fd_WriteSet is called with a descriptor, the priority is looked up and if its priority is at least as high as the current priority, it is placed in the readNow/writeNow mask. Regardless of priority, it is placed in the readLater/writeLater mask. When prioritySelect.Select is called, the readNow and writeNow masks are used with the timeout value for that priority. If the select at the current priority shows no activity, then the current priority drops to the next lower priority and the descriptors in the readLater/writeLater masks are examined. Any descriptors which have a priority as least as high as the new priority are then placed in the readNow/writeNow masks and another select is performed with the timeout value of the new priority. This continues until the lowest priority is reached and processed using select. At this point, if the timeout for the lowest priority is not infinite or activity is found, the prioritySelect.Select call returns.

There are additional internal data structure and operations that are used in the preferred embodiment. Referring to FIG. 2, this is a table of all the descriptors in use. However, it should be understood that other descriptors may be added to the table, and are within the scope of the present invention. When a descriptor is first created, it is placed in this table twice—once for reading and once for writing, unless it is a read only or write only type of descriptor. The table is subsequently used to update and retrieve information in constant time. If the descriptor is set in the mask prior to the actual select and remains set afterward, then the hits variable is incremented and the misses is set to zero. If the descriptor is set in the mask prior to the select and is not set afterward, then the misses variable is incremented and the hits variable is set to zero. The priorityTableIndex variable is set to the index of the Priority Array that contains the descriptor's priority. The variable hits is compared with the corresponding priority table entry hitsToAdvance and misses is compared to missesToDrop to determine priority change. If the priority changes, then priorityTableIndex is updated to the index of the new priority.

The priority array contains the information about all the priorities. Each element in the array shown in FIG. 3 has the following information:

priority—An integer value priority that corresponds to the number of iterations of the driver loop between actual selects.

hitsToAdvance—The number of successive hits to move up in priority.

missesToDrop—The number of successive misses to move down in priority.

selectWidth—Used to track the select width (max. descriptor+1) for that priority.

The preferred embodiment also utilizes a value array to determine the current priority and is shown in FIGS. 4 and 5, with an example configuration of priority table shown in FIG. 4 and an example of iterating through a value array being shown in FIG. 5. The Value array shown in FIG. 5 is used to determine the current priority and is configured in the beginning based on the priorities given as shown in FIG. 4. FIG. 5 illustrates an example of how an index into this array is used to get the given priority through 10 iterations of prioritySelect.Select.

More particularly, this array contains the indices into the priority table that represent the current priority. A pointer moves across this array, advancing on each Select. In this example, the priorities are 1,3, and 10. This means that in the priority table, index 0 has priority 1, index 1 has priority 3, and index 2 has priority 10. At the time of each prioritySelect.Select call, the current position of the pointer contains the index into the priority table for the current priority. The Value table is constructed such that priority n becomes the current priority every nth Select. Once the end of the table is reached, the index returns to 0. Note that the priority is 3 every $3^{rd}$ iteration and the priority is 10 on the $10^{th}$.

The general usage model and implementation steps that are used in the preferred embodiment are set out below in pseudo code. It should be understood that languages such as Java, C, C++ will typically be used in the actual implementation.

```
Driver Loop
  For each descriptor for read D
    prioritySelect.Fd_ReadSet(D)
  For each descriptor for write D
    PrioritySelect.Fd_WriteSet(D)
  prioritySelect.Select()
  For each descriptor for read D matched with write E
    EvalAndService D E
Fd_ReadSet
  Set descriptor in readLater mask
  if(descriptor.priority >= current priority)
    set descriptor in readNow mask
Fd_WriteSet
  Set descriptor in writeLater mask
  if(descriptor.priority >= current priority)
    set descriptor in writeNow mask
Select
  nextPriorityIndex = get next iteration priority from the Value table and
increment pointer
  loop
    system select using readNow and writeNow masks and the current
priority
timeout
    if any descriptor succeeded or currentPriorityIndex ==
maxPriorityIndex
then break loop else currentPriorityIndex++
    for each descriptor D in the Descriptor Table
      if D is set in the readLater mask
        if priority of D >= current priority
          Set D in readNowMask
      if D is set in the writeLater mask
```

-continued

```
        if priority of D >= current priority
          Set D in writeNowMask
  currentPriorityIndex = nextPriorityIndex
  EvalAndService
    if prioritySelect.Fd_ReadIsSet D and prioritySelect.Fd_WriteIsSet E
      read from D and Write to E
    if prioritySelect.Fd_WriteIsSet D and prioritySelect.Fd_ReadIsSet E
      read from E and Write to D
Fd_ReadIsSet
  if D is set in readNow mask (this mask was passed to the select call)
    misses = 0
    hits++
    if hits == hitsToAdvance && priority < maxPriority
      hits = 0
      priorityIndex -- // raise priority
    return TRUE
  else
    misses ++
    hits = 0
    if misses == missesToDrop && priority > minPriority
      misses = 0
      priorityIndex ++ // lower priority
    return FALSE
Fd_WriteIsSet
  if D is set in writeNow mask (this mask was passed to the select call)
    misses = 0
    hits++
    if hits == hitsToAdvance && priority < maxPriority
      hits = 0
      priorityIndex -- // raise priority
    return TRUE
  else
    misses++
    hits = 0
    if misses == missesToDrop && priority > minPriority
      misses = 0
      priorityIndex ++ // lower priority
    return FALSE
    . . .
```

From the foregoing description, it should be understood that an improved method of efficiently servicing large numbers of simultaneous IO descriptors used in a computer operating system which has many desirable attributes and advantages. The method and algorithm module queries those descriptors that are most likely to have activity, but also reliably queries all descriptors over time, and dynamically adjusts the frequency of queries to maintain maximum efficiency as conditions change. As a result, more efficient processing speed is achieved.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

The full implementation of the algorithm module of the present invention is set forth in the attached Appendix A.

Various features of the invention are set forth in the appended claims.

APPENDIX A

Full Implementation of the Priority Select Module
/*************************************************
************
*
* (c) COPYRIGHT HEWLETT PACKARD COMPANY 1999.
ALL RIGHTS RESERVED.
* No part of this program may be photocopied, reproduced or translated -continued

APPENDIX A

```
* to another program language without the prior written consent of the
* Hewlett-Packard Company.
*
*****************************************************************
************/
/*****************************************************************
************
*
* Please use 'cleartool' for revision history.
*
* For additional information, please refer to the following documents:
*
* Transport Interface Protocol (Xip2) by Dave Kumpf
* Xip2 External Reference Specification (ERS) by Chuck Courey
* Xip2 Internal Specification (IS) by Chuck Courey
*
* Author: Chuck Courey
*
*****************************************************************
************/
#ifndef PRIORITYSELECT_H
#define PRIORITYSELECT_H
#include <stdio.h>
#include <stdlib.h>
#include "wvLib.h"
#define WVEVENT(a,b,c)
typedef enum {ps_socket_type,ps_nonsocket_type } PsSocketType;
/*
class PrioritySelect
{
const char PSREAD = 0;
const char PSWRITE = 1;
// Mask to track current priority descriptors for read
fd_set readNow;
// Mask to track all descriptors for read
fd_set readLater;
// Mask to track current priority descriptors for write
fd_set writeNow;
// Mask to track all descriptors for write
fd_set writeLater;
// Any descriptor set?
BOOL bFdIsSet;
// Function pointer that is used to turn off internal debugging info
INT (PrioritySelect::*InternalSelect)
    (INT,fd_set*,fd_set*,fd_set*,timeval*);
// Map of priorities
struct PriorityTableEntry
{
timeval *pTimeOut; // time out for this priority
INT iPriority;    // value of this priority
INT iHitsToAdvance;// successful selects to advance at this priority
INT iMissesToDrop; // successful selects to advance at this priority
INT iSelectWidth; // select width at this priority
PriorityTableEntry()
    :pTimeOut((timeval*) NULL),iPriority(0),
    iHitsToAdvance(0),iMissesToDrop(0),iSelectWidth(0)
{}
~PriorityTableEntry()
{
if(pTimeOut)
    {
      delete pTimeOut;
    }
}
// Sets up a priority table entry based on arguments passed
VOID Setup(CHAR *pSec,CHAR *pUSec,INT thisPriority,
       INT thisHitsToAdvance,INT thisMissesToDrop)
{
iPriority= thisPriority;
iHitsToAdvance = thisHitsToAdvance;
iMissesToDrop = thisMissesToDrop;
// if NULL, then time out is infinite
if(strcmp(pSec,"NULL"))
{
  pTimeOut = new timeval;
  pTimeOut->tv_sec = atoi(pSec);
  pTimeOut->tv_usec = atoi(pUSec);
```

-continued

APPENDIX A

```
}
}
} *pPriorityTable;
// Maps a given system descriptor to it's current priority -- for both
// read and write. Also tracks the current number of consecutive hits
// and misses at the current priority for that descriptor.
struct FdTableEntry
{
INT iHits;
INT iMisses;
INT iIndexIntoPriorityTable;
FdTableEntry(INT32 iDefaultIndex = 0) : iHits(0),iMisses(0),
// Start at 2nd highest
iIndexIntoPriorityTable(iDefaultIndex)
{}
} (*pFdTable)[2];
/*
* Creates an array that is the size of the lowest (highest value) priority.
* Lets say the priorities are 1,3,5,10. Then the array would be size 10 and
* would look like the following:
*
* pos: 0 1 2 3 4 5 6 7 8 9
* val: 1 1 3 1 5 3 1 1 3 10
*
* (Actually, the 'val' values are really an index into the priority table
* but the priorities of those table values would look like the above
* example). Indecies representing a priority or a multiple of that priority
* assume that priority as a value (ie pos 3 (- 1 for array indexing),6
* (- 1 for array indexing) and 9 (- 1 for array indexing) would contain
* a 3.A lower priority (higher value) or multiple of that priority
* always takes precedence (ie pos 4 and 9 above).
* Once this array is created then a position marker iterates across
* this array -- assuming a new position after each successful select on
* any descriptor. The position of this marker represents the current
* priority.
*/
struct ValueTable
{
PrioritySelect *pSelect;
INT16 iMaxPriority;
INT16 iIndexTableIndex;
INT16 *pIndexTable;
ValueTable(PrioritySelect *p)
    :pSelect(p),iMaxPriority((INT16)0),iIndexTableIndex(0),
    pIndexTable((INT16*) NULL)
{
}
~ValueTable()
{
if(pIndexTable)
{
delete [] pIndexTable;
}
}
/* Sets up the value table */
VOID Setup()
{
INT i;
PriorityTableEntry *pE;
// Get the maximum priority
iMaxPriority = pSelect->pMaxPriority->iPriority;
// Allocate a new table the size of that priority
pIndexTable = new INT16[iMaxPriority];
// Count through all the value array positions
for(i = 0;i <pSelect->pMaxPriority->iPriority;i++)
{
// For a given position, start at the lowest priority
    for(pE = pSelect->pMaxPriority;;pE--)
    {
// Get the priority table position of this priority entry
INT j = pE - pSelect->pPriorityTable;
// If this value array position divides this priority, then
// this value array value will index this priority in the
// pPriorityTable.
    if(!((i+1) % pE->iPriority))
    {
       // Set the value to this index
```

-continued

APPENDIX A

```
    pIndexTable[i] = j;
    XIP_LOG(eGeneral, "Setting %d to %d ",i,pE->iPriority);
// Break out to the next 'i' value
    break;
  }
 }
}
for(i = 0;i < pSelect->pMaxPriority->iPriority;i++)
{
  XIP_LOG(eGeneral,"%d %d ",i,pIndexTable[i]);
}
}
INT Value()
{
// Get the current index into the pPriorityTable
INT16 iIndex = pIndexTable[iIndexTableIndex];
// Inc the pointer to the next position -- wrapping if necessary
iIndexTableIndex = (iIndexTableIndex + 1) % iMaxPriority;
// Return the priority index
return iIndex;
}
} valueTable;
friend ValueTable;
// Sets the descriptor in the mask if it has >= priority
VOID Fd_SetConditionally(
    INT iFd,   /* This descriptor */
    INT iType,   /* PSREAD or PSWRITE */
    fd_set *pMask, /* Read or write mask */
    PriorityTableEntry *pPriority /*Current priority*/
    )
{
// Get the priority entry for this descriptor
PriorityTableEntry &pEntry =
pPriorityTable[pFdTable[iFd][iType].iIndexIntoPriorityTable];
// If my this descriptor priority is greater than (lower in value)
// the current priority entry...
if(pEntry.iPriority <= pPriority->iPriority)
{
// We set at least one
bFdIsSet = TRUE;
// Set this descriptor in the mask
FD_SET(iFd,pMask);
// Adjust the select width if necessary
if(pPriority->iSelectWidth < iFd)
{
  pPriority->iSelectWidth = iFd;
}
}
}
}
// This function looks in the mask containing all of the applications
// descriptors that were requested to be set and conditionally sets
// the ones that have to correct priority.
VOID Fd_ResetAll()
{
int i;
// Zero out the current masks
FD_ZERO(&readNow);
FD_ZERO(&writeNow);
// Reset our 'at least one is set' value
bFdIsSet = FALSE;
// Iterate through all the descriptors
for(i = 0;i <= iLaterSelectWidth;i++)
{
// If it is set in this mask, then conditionally set it in the current
// mask for both read and write
if(FD_ISSET(i,&readLater))
{
  Fd_SetConditionally(i,PSREAD,&readNow,pCurrentPriority);
}
if(FD_ISSET(i,&writeLater))
{
  Fd_SetConditionally(i,PSWRITE,&writeNow,pCurrentPriority);
}
}
}
// Checks to see if a mask bit is set
BOOL Fd_Isset(
```

-continued

APPENDIX A

```
    INT iFd,   /* This descriptor */
    INT iType,   /* PSREAD or PSWRITE */
    fd_set *pMask, /* This maks */
    fd_set *pLaterMask /* All requests */
    )
{
// Get our FdEntry object
FdTableEntry &pFdEntry = pFdTable[iFd][iType];
// Get our priority from the priority table
PriorityTableEntry &pEntry =
pPriorityTable[pFdEntry.iIndexIntoPriorityTable];
// If our priority is >= (less in value) then the current priority
// and the application requested that we be queried...
if(pEntry.iPriority <= pCurrentPriority->iPriority &&
FD_ISSET(iFd,pLaterMask))
{
BOOL result;
// If we are set...
if((result = FD_ISSET(iFd,pMask)))
{
// Increment our consecutive hits and see if we should advance
    if(++pFdEntry.iHits == pEntry.iHitsToAdvance)
    {
    // Clear our consecutive hits since we're advancing
pFdEntry.iHits = 0;
// Advance our priority if not at the max
    if(pFdEntry.iIndexIntoPriorityTable > 0)
    {
pFdEntry.iIndexIntoPriorityTable--;
    }
}
// Clear our consecutive misses
pFdEntry.iMisses = 0;
}
else
{
// Not set -- increment and check out consecutive misses -- should
// we drop?
    if(++pFdEntry.iMisses == pEntry.iMissesToDrop)
    {
// Set our consecutive misses to 0
pFdEntry.iMisses = 0;
// Drop our priority if not at the lowest already
if(pFdEntry.iIndexIntoPriorityTable < pMaxPriority - pPriorityTable)
{
pFdEntry.iIndexIntoPriorityTable++;
}
}
// Set our consecutive hits to 0
    pFdEntry.iHits = 0;
}
// Return whether we're set or not
return result;
}
return FALSE;
}
INT32 Fd_Priority(INT32 iFd,INT32 iType)
{
return
pPriorityTable[pFdTable[iFd][iType].iIndexIntoPriorityTable].iPriority;
}
INT32 CountPriorities(CHAR*,CHAR*);
PriorityTableEntry *pCurrentPriority; // Current priority -- set when
    // select is called
PriorityTableEntry *pNextPriority; // Priority used when setting masks
PriorityTableEntry *pMaxPriority; // Max is stored for convience
struct timeval    *pLJTimeOut; // Log jam time out value
BOOL    bMaxPriorityTimeValIsSwapped; // Is our max priority timeval
swapped?
INT iLaterSelectWidth;   // Select width for all descriptors
INT iSelectWidth;   // Current select width
public:
PrioritySelect(INT,CHAR*);
~PrioritySelect(){} // Define this!
INT Drop(INT iFd)
{
return 0;
```

APPENDIX A

```
}
INT32 Fd_ReadPriority(INT iFd)
{
return Fd_Priority(iFd,PSREAD);
}
INT32 Fd_WritePriority(INT32 iFd)
{
return Fd_Priority(iFd,PSWRITE);
}
// Sets a descriptor in a mask for read
VOID Fd_ReadSet(INT iFd)
{
// Always set in this mask
FD_SET(iFd,&readLater);
// Adjust the width
if(iLaterSelectWidth < iFd)
{
iLaterSelectWidth = iFd;
}
// Set in this mask if priority is right
Fd_SetConditionally(iFd,PSREAD,&readNow,pNextPriority);
}
// Sets a descriptor in a mask for write
VOID Fd_WriteSet(INT iFd)
{
// Always set in this mask
FD_SET(iFd,&writeLater);
// Adjust the width
if(iLaterSelectWidth < iFd)
{
iLaterSelectWidth = iFd;
}
// Set in this mask if priority is right
Fd_SetConditionally(iFd,PSWRITE,&writeNow,pNextPriority);
}
// Queries to see if this descriptor is set in the read mask
BOOL Fd_ReadIsSet(INT iFd)
{
return Fd_Isset(iFd,PSREAD,&readNow,&readLater);
}
// Queries to see if this descriptor is set in the write mask
BOOL Fd_WriteIsSet(INT iFd)
{
return Fd_Isset(iFd,PSWRITE,&writeNow,&writeLater);
}
// Zeros out all internal masks
VOID Fd_ZeroAll()
{
bFdIsSet = FALSE;
FD_ZERO(&readNow);FD_ZERO(&readLater);
FD_ZERO(&writeNow);FD_ZERO(&writeLater);
}
void FormatFds(fd_set *f,INT width,char *str,char *buf)
{
char *b;
INT i;
strcpy(buf,str);
for(i = 0;i < width;i++)
{
if(FD_ISSET(i,f))
{
   b = buf + strlen(buf);
   sprintf(b,"%d",i);
}
}
}
VOID PrintMasks(int indent = 0)
{
char buf[250];
///#ifndef XIP_MODTEST_ON
///#define XIP_MODTEST_LOG printf
///#endif
XIP_LOG(ePrioritySelect, "%*sCurrent Priority: %d %*sCurrent Width: %d ",
   indent," ",pCurrentPriority->iPriority,indent," ",iSelectWidth);
FormatFds(&readNow,iSelectWidth + 1,"Read: ",buf);
XIP_LOG(ePrioritySelect, "%*s%s ",indent,"",buf);
```

```
FormatFds(&writeNow,iSelectWidth + 1,"Write: ",buf);
XIP_LOG(ePrioritySelect, "%*s%s ",indent,"",buf);
///#ifndef XIP_MODTEST_ON
///#undef XIP_MODTEST_LOG
///#endif
}
#ifdef XIP_MODTEST_ON
VOID dump(int indent)
{
XIP_MODTEST_LOG("%*sType %s Address 0x%x ",indent," ",
   "PrioritySelect",(UINT32) this);
PrintMasks(indent);
}
#endif
INT PrintSelect(INT iWidth,fd_set *pR,fd_set *pW,fd_set *pE,timeval *to)
{
INT foo;
INT result;
PrintMasks();
result = select(iWidth,pR,pW,pE,to);
if(result != ERROR) errno = 0;
foo = errno;
XIP_LOG(ePrioritySelect,"Result %d ",result);
if(result == -1)
{
XIP_LOG(ePrioritySelect,"Errno: %d ",foo);
}
else
{
errno = 0;
}
return result;
}
/*
* Does the actual select
*/
INT NoPrintSelect(INT iWidth fd_set *pR,fd_set *pW,fd_set *pE,timeval *to)
{
INT res;
res = select(iWidth,pR,pW,pE,to);
if(res != ERROR) errno = 0;
return res;
}
VOID Register(INT iFd,INT iWMin = 1,
   INT iRMin = 1,
   enum PsSocketType eType = ps_nonsocket_type) {}
VOID SwapMaxPriorityTimeOutIfNot(BooL bDesiredSwapState)
{
if(bMaxPriorityTimeValIsSwapped != bDesiredSwapState)
{
struct timeval *pTmp = pMaxPriority->pTimeOut;
pMaxPriority->pTimeOut = pLJTimeOut;
pLJTimeOut = pTmp;
bMaxPriorityTimeValIsSwapped = bDesiredSwapState;
}
}
/*
* This is the function called by the application when it does a select.
*/
INT Select(BOOL bPoll = FALSE)
{
iSelectWidth = 0;
INT result = 0;
// Set to the next priority (the one used in setting the masks
pCurrentPriority = pNextPriority;
SwapMaxPriorityTimeOutIfNot(bPoll);
// Loop until internal break
for(;;)
{
// Adjust the selectwidth to that of the current priority
if(iSelectWidth < pCurrentPriority->iSelectWidth)
{
   iSelectWidth = pCurrentPriority->iSelectWidth;
}
```

APPENDIX A

```
// Clear the select width for that priority
pCurrentPriority->iSelectWidth = 0;
if(pCurrentPriority == pMaxPriority)
{
   WVEVENT(20,0,0);
}
if(bFdIsSet)
{
// If a descriptor is set then call select. Non zero result means
// something has happened so break out of the loop
if((result = (this->*InternalSelect)(iSelectWidth+1,
      &readNow,
      &writeNow,
      NULL,
      pCurrentPriority->pTimeOut)))
   {
   break;
   }
}
// No descriptors succeeded so lower the priority and try again unless
// we're already at the lowest priority
if(++pCurrentPriority > pMaxPriority)
{
   break;
}
// Reset the masks correctly
Fd_ResetAll();
}
// Set the next priority for setting the masks the next time
pNextPriority = &pPriorityTable[valueTable.Value()];
// Clear our width
iLaterSelectWidth = 0;
return result;
}
void SetPrint() {InternalSelect = &PrintSelect;}
void ClearPrint() {Internal Select = &NoPrintSelect;}
};
// Constructor for this module.
// Args:
// iMaxDescrs -- maximum possible range of descriptors to track
// iTotalPriorities -- total priorities in the pConfig string
/* pConfig -- A character string of the format:
priority_1 hits_to_advance_1 hits_to_drop_
1 sec_timeout_1 usec_timeout_1;
priority_2 hits_to_advance_2 hits_to_drop_
2 sec_timeout_2 usec_timeout_2;...
priority_N hits_to_advance_N hits_to_drop_
N sec_timeout_N usec_timeout_N
If the timeout is infinite, then the word NULL is substituted for
sec_timeout usec_timeout
*/
// Counts the number of priority tokens in 'pSt'r delemited by 'delim'
inline INT32
PrioritySelect::CountPriorities(CHAR *pStr,CHAR *delim)
{
INT32 iPriority;
INT32 i;
INT32 iCount = 0;
CHAR pCopy[100],*pToken,*pToCopy,*pRemaining = NULL;
strcpy(pCopy,pStr);
for(pToCopy = pCopy,i = 0;
(pToken = strtok_r(pToCopy,delim,&pRemaining));
pToCopy = NULL,i++)
{
sscanf(pToken,"%d",&iPriority);
if(iPriority)
   {
   iCount++;
   }
}
return iCount;
}
inline
PrioritySelect::PrioritySelect(
      INT iMaxDescrs,
      CHAR *pConfig
      )
:bFdIsSet(FALSE),InternalSelect(&NoPrintSelect),
pPriorityTable((PriorityTableEntry*) NULL),
valueTable(this),pLJTimeOut((struct timeval*) NULL)
bMaxPriorityTimeValIsSwapped(FALSE),iSelectWidth(0)
{
INT32 i,iTotalPriorities;
CHAR *pToken,*pRemaining = NULL;
CHAR configString[192],*pConfigString;
if(strlen(pConfig) > 191)
{
XIP_PANIC(cCauseBadParm,
   "Config String too long for Priority Select Configuration: %d ",
   strlen(pConfig));
}
strcpy(configString,pConfig);
pConfigString = configString;
// Count the priorities
iTotalpriorities = CountPriorities(pConfig,";");
// Create the priority table
pPriorityTable = new PriorityTableEntry[iTotalPriorities];
// Parse the configuration (pConfig) string
for(i = 0;i < iTotalPriorities;)
{
CHAR pSec[100],pUSec[100];
INT iPriority,iHits,iMisses;
// Get the first ';' delimeted token
if(!(pToken = strtok_r(pConfigString,";",&pRemaining)))
   {
   XIP_PANIC(cCauseBadParm,"Tokens don't match priority count ");
   }
// Parse the fields in that token
sscanf(pToken,"%d    %d    %d    %s
%s",&iPriority,&iHits,&iMisses,pSec,pUSec);
// If priority is 0, then we are configuring the swap time out value
if(!iPriority)
   {
   // Delete if already initialized
   if(pLJTimeOut)
      {
      delete pLJTimeOut;
      }
   // Is out time out infinite?
   if(!strcmp(pSec,"NULL"))
      {
      // Set to infinite
      pLJTimeOut = (struct timeval*) NULL;
      }
   else
      {
      // Create and initialize a new one
      pLJTimeOut = new struct timeval;
      pLJTimeOut->tv_sec = atoi(pSec);
      pLJTimeOut->tv_usec = atoi(pUSec);
      }
   }
else
   {
   // Call the initialization function for the priority table entry
   // corresponding to that token
   pPriorityTable[i++].Setup(pSec,pUSec,iPriority,iHits,iMisses);
   }
pConfigString = NULL;
}
// Set the pointer to the maximum priority entry
pMaxPriority = &pPriorityTable[iTotalPriorities - 1];
// Create the file descriptor mapping table
pFdTable    =   new    FdTableEntry[iMaxDescrs][2](pMaxPriority   ==
pPriorityTable ? 0 : 1);
// Initialize the Value table
valueTable.Setup();
// Get the first value based endtry
pNextPriority = &pPriorityTable[valueTable.Value()];
//Initialize the select width
iLaterSelectWidth = 0;
}
#endif // PRIORITYSELECT_H
```

What is claimed is:

1. A method of efficiently querying and processing individual descriptors of a group of descriptors by a processing means operating with a large set of devices or processes, said method comprising the steps of:

querying said plurality of descriptors and processing said descriptors that have activity;

assigning individual descriptors to a predetermined priority level of a hierarchical set of priority levels that are proportional to the amount of activity that individual descriptors are demonstrating;

successively querying said individual descriptors at various intervals that vary in accordance with the amount of activity demonstrated by active descriptors and the assigned priority level of said individual descriptors by executing a driver loop which queries a plurality of descriptors of said predetermined sized group of descriptors and processes the descriptors that have activity, said plurality of descriptors including those descriptors which are in the highest priority level;

changing the priority level of individual descriptors when the amount of activity of said individual descriptors changes from that which is expected in a particular level, wherein said priority levels vary from higher priority levels to lower priority levels, said higher priority levels having a higher amount of activity, the frequency of querying being higher for higher priority levels.

2. A method as defined in claim 1 wherein said step of changing the priority level comprises changing the level of an individual descriptor to a higher level when said descriptor activity exceeds that which is expected for its assigned priority level and changing to a lower priority level when the activity is lower than that which is expected for its assigned priority level.

3. A method as defined in claim 2, wherein each priority level has a range of values of activity, the lowest priority level insuring a query within a predetermined time period.

4. A method as defined in claim 1 wherein said large area network comprises a network that includes the Internet.

5. A method of efficiently querying and processing individual descriptors of a group of descriptors by a processing means operating with a large set of devices or processes, said method comprising the steps of:

querying said plurality of descriptors and processing said descriptors that have activity;

assigning individual descriptors to a predetermined priority level of a hierarchical set of priority levels that are proportional to the amount of activity that individual descriptors are demonstrating;

successively querying said individual descriptors at various intervals that vary in accordance with the amount of activity demonstrated by active descriptors and the assigned priority level of said individual descriptors;

changing the priority level of individual descriptors when the amount of activity of said individual descriptors changes from that which is expected in a particular level, wherein said priority levels vary from higher priority levels to lower priority levels, said higher priority levels having a higher amount of activity, the frequency of querying being higher for higher priority levels wherein each descriptor of said predetermined sized group of descriptors is queried during multiple successive executions of a driver loop which queries a plurality of descriptors of said predetermined sized group of descriptors and processes the descriptors that have activity, each descriptor being queried at an interval n that varies between 1 and N, where n represents the number of executions of said driver loop that are required to query an individual descriptor and N represents a large number of iterations of executions of said driver loop and 1 represents every execution of said driver loop.

6. A method as defined in claim 1 further including the step of reinitiating said querying step after a time out value in the event no descriptors have activity.

7. A method as defined in claim 6 wherein said time out value represents a variable duration that is inversely proportional to said priority level.

8. A method of querying and processing individual descriptors of a group of descriptors by a processing means operating with a large set of devices or processes, said method comprising the steps of:

iteratively querying said plurality of descriptors by executing a driver loop which queries a plurality of descriptors of said predetermined sized group of descriptors and processing said descriptors, including those descriptors which are in the highest priority level, that have activity a sufficient number of times to determine the level of activity of individual descriptors;

grouping individual descriptors in predetermined priority levels in a hierarchical set of priority levels based upon the amount of activity that is occurring for each individual descriptor, wherein said priority levels vary from higher priority levels to lower priority levels, said higher priority levels having a higher amount of activity, the time duration between successive queries being shorter for higher priority levels;

changing the priority level of individual descriptors during successive querys when the amount of activity of said individual descriptors changes from that which is expected at a particular level.

9. A method as defined in claim 8 wherein said step of changing the priority level comprises changing the level of an individual descriptor to a higher level when said descriptor activity exceeds that which is expected for its assigned priority level and changing to a lower priority level when the activity is lower than that which is expected for its assigned priority level.

10. A method as defined in claim 9 wherein each priority level has a range of values of activity, the lowest priority level insuring a query within a predetermined time period.

11. A method as defined in claim 8 wherein each descriptor of said group of descriptors is queried during multiple successive executions of a driver loop which querys a plurality of descriptors of said group of descriptors and processes the descriptors that have activity, each descriptor being queried at an interval n that varies between 1 and N, where n represents the number of executions of said driver loop that are required to query an individual descriptor and N represents a large number of iterations of executions of said driver loop and 1 represents a query every execution of said driver loop.

12. A method as defined in claim 8 further including the step of reinitiating said querying step after a time out value in the event no queried descriptors have activity.

13. A method as defined in claim 12 wherein said time out value represents a variable duration that is inversely proportional to said priority level.

* * * * *